US009424760B2

(12) United States Patent
Ghez et al.

(10) Patent No.: US 9,424,760 B2
(45) Date of Patent: Aug. 23, 2016

(54) SIMULATION APPARATUS

(75) Inventors: Olivier Ghez, London (GB); Meredith Louise Allen, Melbourne (AU); Margarita Katharine Burmester, London (GB)

(73) Assignee: Royal Brompton & Harefield NHS Foundation, London (GB)

( * ) Notice: Subject to any disclaimer, the term of this patent is extended or adjusted under 35 U.S.C. 154(b) by 281 days.

(21) Appl. No.: 14/128,108

(22) PCT Filed: Jun. 22, 2012

(86) PCT No.: PCT/GB2012/051470
§ 371 (c)(1),
(2), (4) Date: Mar. 27, 2014

(87) PCT Pub. No.: WO2012/175993
PCT Pub. Date: Dec. 27, 2012

(65) Prior Publication Data
US 2014/0220532 A1    Aug. 7, 2014

(30) Foreign Application Priority Data

Jun. 22, 2011 (GB) .................................. 1115041.8

(51) Int. Cl.
*G09B 23/28* (2006.01)
*G09B 23/30* (2006.01)
*G09B 23/32* (2006.01)

(52) U.S. Cl.
CPC ................ *G09B 23/30* (2013.01); *G09B 23/32* (2013.01)

(58) Field of Classification Search
USPC .......... 434/262, 265, 267, 272, 274, 275, 295
See application file for complete search history.

(56) References Cited

U.S. PATENT DOCUMENTS

| 2,678,505 | A | | 5/1954 | Munson | |
|---|---|---|---|---|---|
| 3,209,469 | A | * | 10/1965 | James | G09B 23/288 434/265 |
| 4,773,865 | A | * | 9/1988 | Baldwin | G09B 23/30 434/267 |
| 6,206,703 | B1 | * | 3/2001 | O'Bannon | G01M 17/0078 434/267 |
| 6,234,804 | B1 | * | 5/2001 | Yong | G09B 23/285 434/267 |
| 8,535,061 | B2 | * | 9/2013 | Boutchko | A61B 5/416 434/262 |
| 8,556,635 | B2 | * | 10/2013 | Toly | G09B 23/285 434/262 |
| 2004/0101814 | A1 | | 5/2004 | Morris et al. | |
| 2008/0305464 | A1 | * | 12/2008 | Lynn | G09B 23/288 434/265 |

FOREIGN PATENT DOCUMENTS

| GB | 2 457 438 A | 8/2009 |
|---|---|---|
| WO | 00/51485 A2 | 9/2000 |

OTHER PUBLICATIONS

International Search Report dated Aug. 10, 2012, issued in PCT Application No. PCT/GB2012/051470, filed Jun. 22, 2012.

* cited by examiner

*Primary Examiner* — Kurt Fernstrom
(74) *Attorney, Agent, or Firm* — Workman Nydegger

(57) ABSTRACT

A medical simulation model is provided for use in medical training, and having a wall defining a chamber, and having a slit in the wall providing access to the interior of the chamber. A pair of rib-cage members is located within the chamber such that adjacent edges of each member are spaced apart from each other. Resilient biasing elements are connected to each rib-cage member and configured such that adjacent edges of the rib-cage members may be brought into contact with each other, or further spaced-apart, against the action of the resilient biasing elements. A conduit is provided to enable fluid to be introduced into the chamber, and a facsimile of a mammalian heart is located within the chamber.

14 Claims, 3 Drawing Sheets

SIMULATION APPARATUS

FIELD OF THE INVENTION

The invention relates to devices for use in training medical personnel, and uses of such devices in medical training.

BACKGROUND AND PRIOR ART KNOWN TO THE APPLICANT

Traditionally medical personnel are trained by a variety of methods including standard educational methodology such as reading and attending lectures to acquire the required technical knowledge of anatomy, physiology and other allied disciplines. Most medical practice also requires practical motor skills, most evidently in the field of surgery, and surgical after-care. For many years this medical training has been gained by dissection of cadavers, observation of medical procedures and supervised training in practice ('see one, do one, teach one' approach).

In more recent times, simulation apparatus has been developed to enable surgeons to practise techniques such as laparoscopic surgery (keyhole surgery) and other such procedures prior to undertaking the procedure on patients. The use of simulation models for training such surgeons is primarily concerned with the development of motor skills for use in such controlled environments. As such the surgeon can train repeatedly and independently.

Most surgical procedures carried out in the controlled environment of an operating theatre, are well-planned, scheduled in advance, and the lead attending clinician has a team of staff to support and assist his or her surgical interventions. However emergency surgical procedures occur unpredictably, outside of theatre, requiring the surgeon to perform in a time critical manner, in a foreign operating environment with an unfamiliar medical team assisting. The infrequency of such an event makes it extremely stressful for all involved.

The inventors have identified a previously unrecognised need for training medical personnel to act quickly and effectively to unexpected situations that might arise outside the controlled environment of an operating theatre, and in which any carefully learnt motor skills have to be exercised without delay, in the face of their own psychological, emotional and physiological responses that might occur in unexpected emergency situations. The apparatus and uses thereof of the present invention seek to provide a solution to the problem.

SUMMARY OF THE INVENTION

Accordingly, the invention provides a medical training simulator or model, for use in medical training, comprising: a wall, defining the boundary of a chamber, said wall having a flexible region and a slit within said region providing access to the interior of said chamber; a pair of rib-cage members, located within said chamber such that adjacent edges of each member are spaced apart from each other; resilient biasing elements, connected to each rib-cage member and configured such that adjacent edges of said rib-cage members may be brought into contact with each other, or further spaced-apart, against the action of the resilient biasing elements; a conduit providing fluid communication between the exterior and interior of said chamber; and a facsimile of a mammalian heart, located within said chamber.

The simulator is intended to be used in a medical education and training session, and to be reusable over a long period of time. In such situations, organic material such as cadavers or real animal models need to be avoided for a number of reasons such as degradation of the materials over time, limited availability of cadavers and issues of storage, infection and tissue disposal. As a result, it is especially preferred that the components of the model, whilst realistic in appearance, are principally composed of plastics/rubber as used in model making for cinematographic special effects. In essence, the model is not itself a deceased animal or person.

Preferably, said wall is provided with holes disposed along adjacent edges of said slit such that sutures may be threaded between adjacent holes each side of said slit, thereby closing said slit to provide a fluid-resistant seal to said chamber. This allows fluids simulating blood to be introduced into the cavity under pressure. The wall is also preferably coloured and textured to very closely mimic the tissue of a real person. Techniques for achieving this are well-known to special effects artists working in the film industry.

More preferably, in any such model, said flexible region of the wall is elastic. The elasticity more closely mimics the physical and mechanical properties of human skin, but also has a further technical role to provide an elastically-constrained chamber. In this way, when fluid is introduced into the chamber to mimic blood arising from a simulated haemorrhage, once the wall of the chamber is breached by opening the slit, the elastic nature of the wall assists in ejecting the blood simulant from the opened slit in a more realistic fashion.

Also in any aspect of the invention it is preferred that each rib-cage member is provided with holes disposed along adjacent edges such that sutures may be threaded between adjacent holes, thereby allowing adjacent edges of the rib-cage members to be held in abutment against the action of the resilient biasing elements.

Also in any aspect of the invention, it is particularly preferred that the conduit discharges into said chamber on the opposite side of said facsimile heart to said slit. This is particularly advantageous, as it hides the opening of the conduit from direct view of a trainee using the apparatus after opening the slit in the chamber wall, necessitating them to locate the site of influx of the fluid by touch alone.

In any aspect of the invention also, it is preferred that the model further comprises an inflatable bladder, located within said chamber. More preferably, the model further comprises a first fluid pump in communication with said bladder and configured to reversibly introduce fluid into said bladder. An air pump, in the form of a reciprocating piston and cylinder, would prove to be particularly suitable. Cycling the introduction of fluid in this way causes the chamber to inflate and deflate, mimicking the breathing of a patient. In particularly preferred embodiments, one of more such inflatable bladders may be contained within facsimiles of lungs, thereby further enhancing the reality of the device.

In any aspect of the invention also, the model preferably further comprises facsimiles of the edge of mammalian lungs, located within said chamber between said slit and said facsimile heart.

In any aspect of the invention also, the model preferably further comprises a facsimile of a mammalian thoracic diaphragm, located within said chamber and positioned adjacent said facsimile heart.

In any aspect of the invention also, the model preferably further comprises a second fluid pump in communication with said conduit to enable introduction of fluid into said chamber.

In any aspect of the invention also, the model preferably further comprises heating means, such as an electrical heating element embedded within sections of the model, or circulatory water pipes, to raise the temperature of said model to between 30 and 45 degrees Celsius.

In aspects of the invention comprising one or more pumps, and/or such a heating means, it is particularly preferred that the overall training system comprises a model as described above and a controller, remote from said model, to control the operation of at least one of said first and second pumps and said heater.

In a related aspect, the invention also includes the use of a model or system described herein for training medical personnel.

BRIEF DESCRIPTION OF THE DRAWINGS

The invention will be illustrated by means of the accompanying drawings in which.

DESCRIPTION OF PREFERRED EMBODIMENTS

Figure 1:
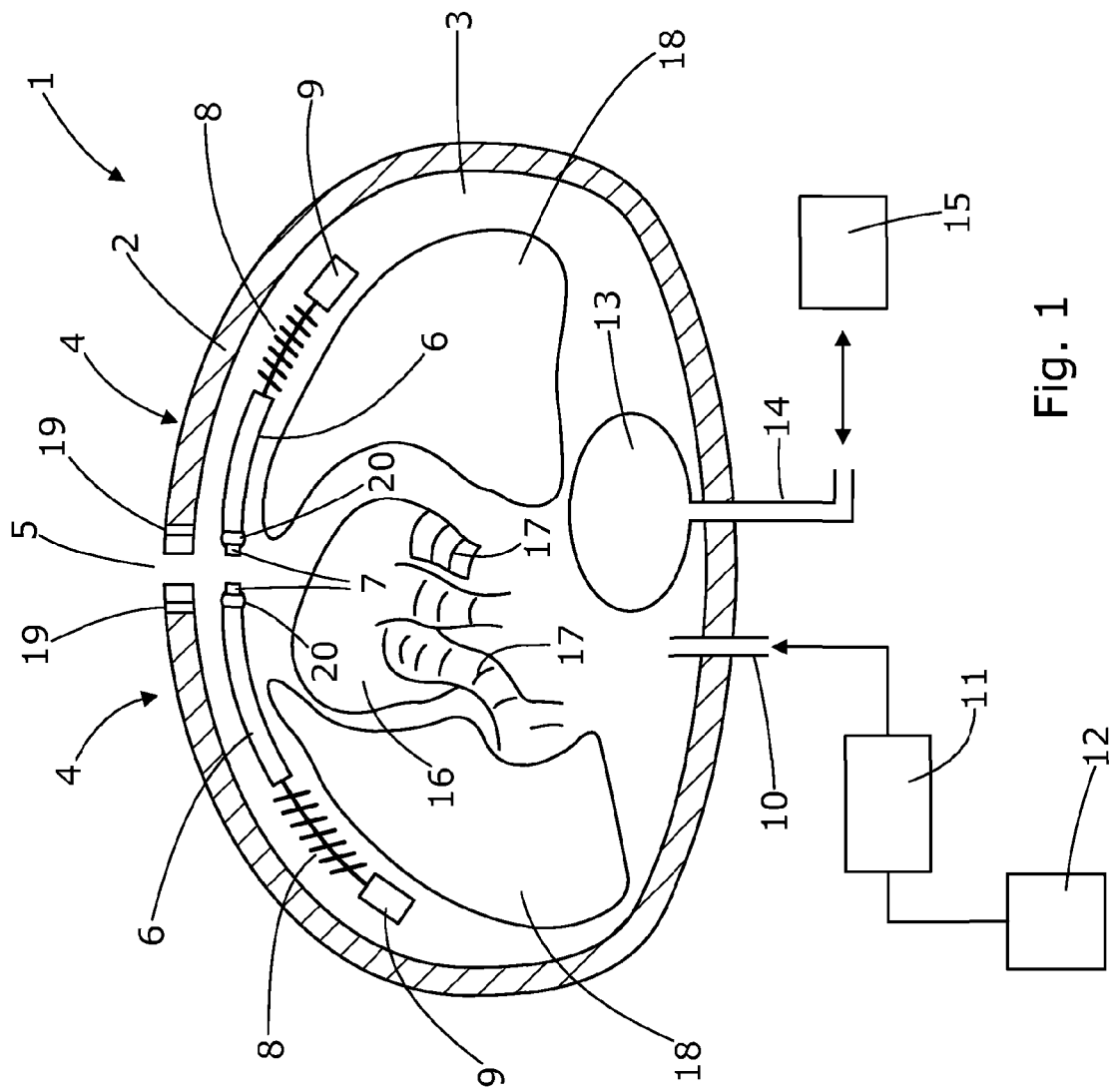
FIG. 1 illustrates a transverse cross-section through an embodiment of the invention.

FIG. 1 illustrates, in transverse cross-sectional view a heart tamponade model, generally indicated by 1. The model comprises a wall 2 that defines the boundary of a chamber 3. The wall 2 has at least a flexible region, indicated by arrows 4. This region, at least, is also preferably made of an elastomeric material, such as moulded latex rubber, and in envisaged embodiments the whole of the wall 2 is made of such material. The shape of the chamber is designed such as to resemble the thoracic region of a mammal, and in especially preferred embodiments, for the training of medical personnel (as opposed to, e.g. veterinary surgeons) the thoracic region represents that of a human body. Also in especially preferred embodiments, the exterior of the model represents the thoracic region of a human child.

Located within the flexible region 4 of the wall 2 is a slit 5 providing access to the interior of the chamber 3. In order to generate the required emotional and physiological response in the person being trained with this apparatus, the surface of the wall 2 is textured and coloured to very closely resemble the skin of a human subject. Also, the edge regions of the wall 2 that define the slit 5 are again textured and coloured to very closely mimic the colour and texture of the skin and underlying adipose tissue found in human subjects.

Located within the chamber 3 is a pair of rib-cage members 6 that will be described in more detail below with reference to FIG. 2. These rib-cage members 6, shown in FIG. 1 in cross-sectional view, are located such that adjacent edges 7 of the rib-cage members are spaced apart from each other. In this way, when viewed by a trainee through the slit 5 they closely resemble a sternotomy.

Also provided are resilient biasing elements 8, in this embodiment, in the form of springs, to enable the adjacent edges 7 of the rib-cage members 6 to be brought into contact with each other, or further spaced apart, against the action of the resilient biasing elements. The strength of the biasing elements, e.g. the size and strength of springs, maybe chosen to provide a force that matches that required to open or close the rib-cage in a real life patient situation. In this embodiment, the biasing elements are anchored to a support frame 9 located around the periphery of the chamber 3, and out of view through the slit 5, thereby increasing the realistic nature of the simulation model.

Also provided within the model is a conduit 10 such as a tube that provides fluid communication between the exterior and interior of the chamber 3. This conduit may be used to introduce a fluid simulating blood into the chamber by means of a pump 11 drawing fluid from a reservoir 12.

Also provided in this embodiment is an inflatable bladder 13 located within the chamber 3 and in fluid connection via a tube 14 with a fluid pump 15 to reversibly introduce fluid into the bladder 13. In this way, the sealed chamber can be caused to successively inflate and deflate, thereby mimicking the breathing of a patient.

Located also within the chamber 3 is a facsimile heart 16. In order to obtain the desired effect on a trainee using the model, the heart should be made as anatomically correct as possible both in provision of facsimiles of the major blood vessels 17 and also in the surface colour and texture of the heart.

In especially preferred embodiments, there is also provided representations of the edges of the lungs 18 of a patient, the edges being visible through the slit 5, when the slit is open.

In this embodiment, the wall 2 of the model is provided with a series of holes 19 located adjacent to the slit and spaced apart effectively in pairs (more clearly visible in FIG. 3) to enable a suture or other medical fixation device, such as a staple, to be inserted in adjacent pairs of holes, thereby closing the slit to form an effectively fluid-resistant seal to the chamber 3.

Also provided, is a series of holes 20 disposed along adjacent edges of each rib-cage member, again such that fixation means, such as staples or wire closures, may be threaded between adjacent holes, thus allowing the adjacent edges of the rib-cage members to be held in abutment, and against the action of the resilient biasing elements 8.

Figure 2:
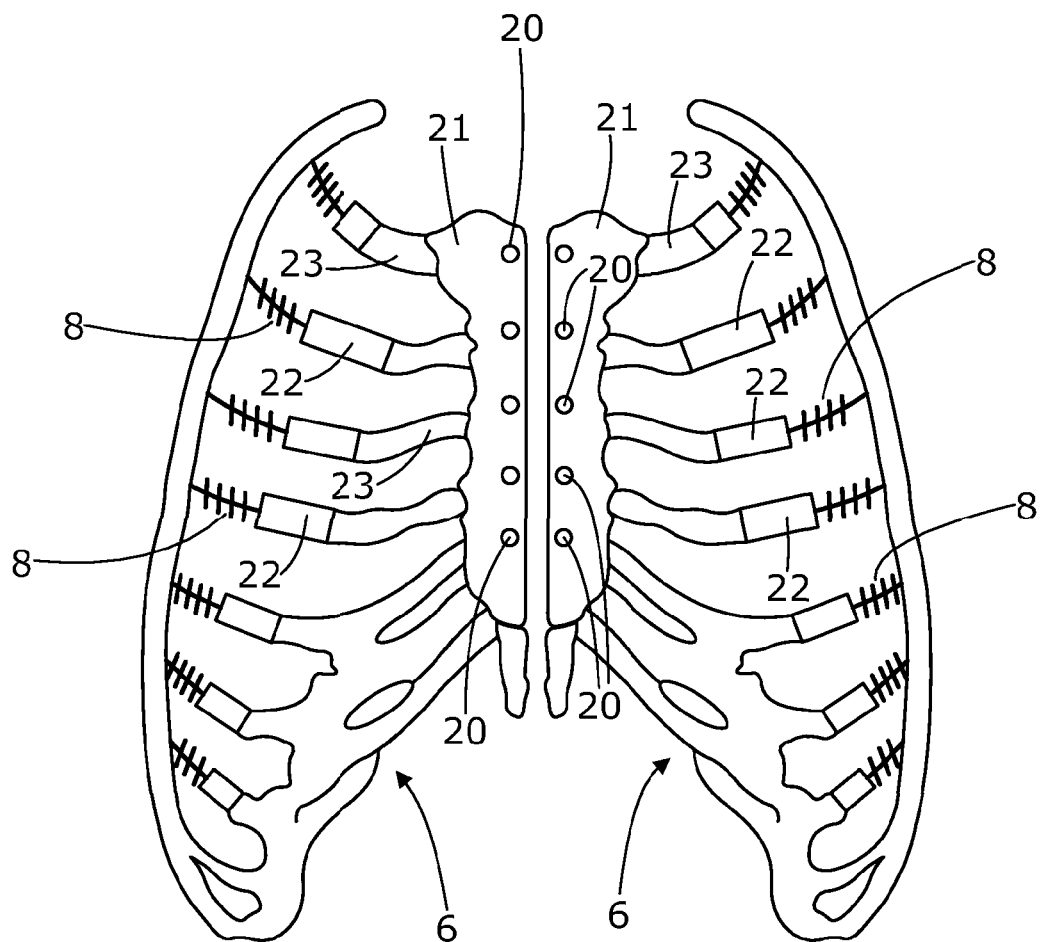
FIG. 2 illustrates a pair of rib-cage members and associated biasing elements.

FIG. 2 illustrates a plan view of a pair or rib-cage members 6 for use in a model of the present invention. Again, and providing the technical effect of inducing anxiety in a trainee working with the model, the rib-cage members 6 are produced to look as realistic as possible, mimicking the rib-cage of a patient. Each rib-cage member 6 comprises a sternum portion 21 and a series of rib-elements 22 each attached to the sternum part 21 by a portion representing the costal cartilage 23. The rib-cage members 6 may, of course, be produced as a single piece construction, for example, in injection-moulded plastics, or sculpted from a plastics material. The surface then may be carefully sculptured or textured and appropriately coloured to represent the various elements of a human (or animal) rib-cage. The two rib-cage members 6 are effectively lateral mirror images of each other, thereby representing, and having the appearance of a divided rib-cage as might be produced following a sternotomy. Adjacent the edges of each rib-cage member is disposed a series of holes 19 through which may be placed fixation staples, wire, or the like, in order to mimic what a surgeon might see following the closure of a median sternotomy. Each of the rib-cage members 6 is attached to one or more resilient biasing elements 8, shown as springs in this embodiment, and which are themselves configured such that, at rest, the adjacent edges of the rib-cage members lie in a slightly spaced-apart configuration but such that the rib-cage members 6 may be brought into contact with each other, or spaced apart even further, against the action of the resilient biasing elements.

Figure 3:
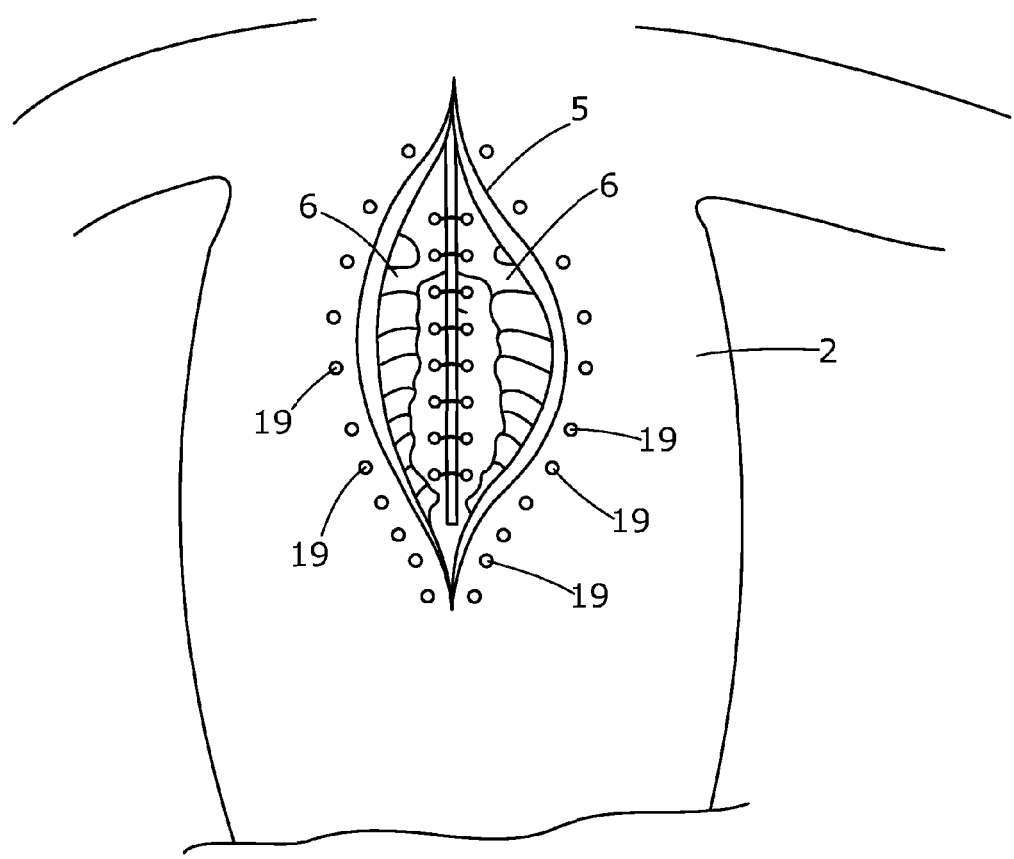
FIG. 3 illustrates an exterior view of a model of the present invention.

FIG. 3 illustrates an external view of a heart tamponade model of the present invention, and shows the slit 5 in the wall 2 of the chamber. As described above, the cut edges of the slit 5 are textured and coloured to represent the skin and adipose layers as found in a typical human thorax. In an embodiment of the invention, the material representing the skin and adipose layers include a reinforcing mesh to reduce wear and tear, particularly that which occurs during suturing.

Adjacent the edges of the slit is a series of holes 19 arranged such that the slit 5 may be sealed closed by the use of sutures, staples or other fixation devices as might be encountered following a thoracic surgical procedure. The material of the wall 2 should be constructed of a substance such as latex rubber such that the slit 5 can be opened by use of surgical retractors to gain access to the interior cavity of the chamber. Once the slit 5 is pulled apart into this configuration, the rib-cage members 6 are visible through the slit 5.

In one mode of use, the heart tamponade model may be used to simulate a haemorrhage in the thoracic cavity following a cardiothoracic procedure. The rib-cage members would be brought together against the action of the biasing elements, and secured in abutment with each other by means of closures such as staples or wire ties. The slit 5 in the wall of the chamber would then be similarly closed using sutures or other fixation means to effectively create a fluid-resistant seal between the interior and exterior of the chamber 3. As part of the training exercise, a fluid resembling blood may be introduced to the interior of the chamber 3 by means of the pump 11 and pipe 10, in order to simulate a haemorrhage. To add realism to the situation, the pump 15 may be used to introduce a fluid such as air into the inflatable bladder 13 located within the chamber 3 to cause the overall model to effectively inflate and deflate sequentially, at a rate akin to a human breathing cycle, thereby simulating the breathing of a patient. To add further realism to the situation, the whole heart tamponade model may be raised to a body temperature, typically around 37° C., and generally within a range of temperatures found within a patient, such as between 30 and 45° Celsius.

The aim of such a simulation exercise as part of a training regime for medical staff would require them to open the sutures closing the slit 5 gaining access to the interior chamber. The presence of the pressurised simulated blood within the chamber would then cause the blood simulant to erupt from the slit 5 in a realistic way. In particular training environments, chest drains (intercostal drains) may be inserted within the model to aid realism. These may also be arranged to be remotely blockable, thereby simulating a situation in which a blocked chest drain leads to increased pressure within the thoracic cavity.

After having opened the slit 5 by removal of the sutures, the trainee must then release the fixings holding the two sides of the simulated rib-cage together, thereby allowing the rib-cage members to separate a little, under the action of the resilient biasing elements. These would then need to be further urged apart, perhaps by use of retractors, thereby allowing access to the interior cavity by the trainee. Having achieved this, the trainee would then need to use suction equipment to clear the thoracic cavity of the simulated blood, and locate the position of the simulated haemorrhage provided by the tube 10.

Although in one aspect, this simulation apparatus seeks to train medical staff in performing such emergency procedures, the inventors have surprisingly found that, even experienced hospital surgeons react to such a simulation model in a much more realistic way than usually occurs with medical training models. The presence of simulated blood, under pressure, and the use of extremely lifelike textures and colours for the elements of the model add surprisingly to the emotional tension created by the situation and allow the trainees to practise performing such techniques whilst feeling levels of stress similar to those that would be encountered in a real situation.

The inventors have carried out confidential trials of the apparatus, using already-trained medical personnel. Stress markers of the personnel were measured during interaction with the model, and surprisingly these rose to levels normally only seen in real emergency situations. The model succeeds in its aim of providing training equipment and methods that allow intervention skills to be honed in a context of underlying stress.

This elicited emotional response may be made more acute, by incorporating the simulation apparatus (which is effectively a representation of the thoracic area) within a complete body model of a patient, for paediatric training, this can, of course, be a realistic model of a baby.

It is anticipated that the model 1 is incorporated within a body simulator including head and limbs. As such the model 1 can be provided as a unit, removable from said simulator and able to be replaced by another unit. In one example contemplated, the elements of the model 1 are housed within a cast material housing, preferably rigid which can be dropped into an appropriately shaped cavity within the simulator's torso. The housing contains the heart, sternum and conduits necessary for the blood supply to be provided. In order for the housing to give a realistic effect the surface is formed of a silicone material shaped to appear as a flat layer and coloured to give the appearance of skin matching the rest of the torso. The perimeter of the housing is shaped such that the surface is level with the neighbouring elements of the simulator body. Fixing means can be included, which can be, but are not limited to Velcro™.

In relation to the simulator body, in one embodiment contemplated the simulator body is formed of a rigid, cast material to which a surface paint is applied to give a realistic finish.

A final surface, such as a polyurethane varnish can be applied to increase the wear resistance of the simulator body. The majority of the limbs of the body are rigidly fixed or cast to the main torso of the body, although a hinged pelvis, for example achieved by means of pin passing through the legs and torso, can enable the torso of the body to be sat up at an angle of around 45°.

The head of the simulator body will typically be hollow to reduce weight and materials used. In addition, a tube can be included, fixed into the mouth. A balloon or other resistive element housed within the head can then be attached to one end of the tube to enable simulation of ventilating a patient.

In addition to the above, or as a separate feature, apertures can be included in the simulator body, such as in the hands, neck, feet etc to allow for the insertion of cannulas to increase the realism of the simulation.

The invention claimed is:

1. A heart tamponade model, for use in medical training, comprising:
   a wall, defining the boundary of a chamber, said wall having a flexible region and a slit within said region providing access to the interior of said chamber;
   a pair of rib-cage members, located within said chamber such that adjacent edges of each member are spaced apart from each other;
   at least one resilient biasing element, connected to each rib-cage member and configured such that adjacent edges of said rib-cage members may be brought into contact with each other, or further spaced-apart, against the action of at least one resilient biasing element;
   a conduit providing fluid communication between the exterior and interior of said chamber; and
   a facsimile of a mammalian heart, located within said chamber.

2. The model according to claim 1 wherein said wall is provided with holes disposed along adjacent edges of said slit such that sutures may be threaded between adjacent holes each side of said slit, thereby closing said slit to provide a fluid-resistant seal to said chamber.

3. The model according to claim 1 wherein said flexible region is elastic.

4. The model according to claim 1 wherein each rib-cage member is provided with holes disposed along adjacent edges such that sutures may be threaded between adjacent holes, thereby allowing adjacent edges of the rib-cage members to be held in abutment against the action of the at least one resilient biasing element.

5. The model according to claim 1 wherein the conduit discharges into said chamber on the opposite side of said facsimile heart to said slit.

6. The model according to claim 1 further comprising an inflatable bladder, located within said chamber.

7. The model according to claim 6 further comprising a first fluid pump in communication with said bladder and configured to reversibly introduce fluid into said bladder.

8. The model according to claim 1, further comprising facsimiles of the edge of mammalian lungs, located within said chamber between said slit and said facsimile heart.

9. The model according to claim 1, further comprising a facsimile of a mammalian thoracic diaphragm, located within said chamber and positioned adjacent said facsimile heart.

10. The model according to claim 1 further comprising a second fluid pump in communication with said conduit to enable introduction of fluid into said chamber.

11. The model according to claim 1 further comprising heating means for raising the temperature of said model to between 30 and 45 degrees Celsius.

12. A training system comprising a model according to claim 7 and a controller, remote from said model, to control the operation of at least said first pump.

13. A training system comprising a model according to claim 10 and a controller, remote from said model, to control the operation of at least said second pump.

14. A training system comprising a model according to claim 11 and a controller, remote from said model, to control the operation of at least said heater.

* * * * *